(12) United States Patent
Chen et al.

(10) Patent No.: US 8,380,577 B2
(45) Date of Patent: Feb. 19, 2013

(54) METHODS, SYSTEMS, COMPUTER PRODUCTS, AND WEBSITE FOR PROGRESSIVE E-COMMERCE

(75) Inventors: Donny Chen, Baltimore, MD (US); Frederick Li, Monroeville, PA (US); Franklin Shen, Lancaster, PA (US)

(73) Assignee: VIICII LLC, Baltimore, MD (US)

( * ) Notice: Subject to any disclaimer, the term of this patent is extended or adjusted under 35 U.S.C. 154(b) by 360 days.

(21) Appl. No.: 12/758,891

(22) Filed: Apr. 13, 2010

(65) Prior Publication Data

US 2011/0251926 A1   Oct. 13, 2011

(51) Int. Cl.
*G06Q 30/00* (2012.01)
(52) U.S. Cl. ..................... 705/26.1; 705/27.1
(58) Field of Classification Search ................. 706/26, 706/26.1; 705/27, 27.1
See application file for complete search history.

(56) References Cited

PUBLICATIONS

Zachary et al., Keep the Chips or Just Cash in? It's a Tech Bet—Many Investors See the Technology Boom Growing, Not Slowing, Asian Wall Street Journal [Victoria, Hong Kong] Oct. 13, 1995: downloaded from ProQuestDirect on the Internet on Nov. 14, 2012, 3 pages.*

* cited by examiner

*Primary Examiner* — James Zurita

(57) ABSTRACT

An e-commerce system where progressive incentives are displayed to entice shoppers to purchase goods is disclosed. The e-commerce system includes a database with a region of memory having data related to a first inventory of physical goods and a second inventory of digital goods. The e-commerce system also includes a website configured to facilitate an event, where the website is coupled to the database for accessing the first inventory in response to the event. The event may be a purchase of one or more physical goods. The e-commerce system further includes a webpage configured to display at least a portion of the first inventory that is available for sale, and to display one or more digital goods, where the webpage presents a locked digital good before the event occurs, and in response to one or more events occurring, the webpage presents an unlocked digital good.

11 Claims, 5 Drawing Sheets

METHODS, SYSTEMS, COMPUTER PRODUCTS, AND WEBSITE FOR PROGRESSIVE E-COMMERCE

BACKGROUND OF THE INVENTION

The present invention relates to a technology for providing incentives for e-commerce shoppers to purchase products, and more particularly to a technology for providing progressive e-commerce.

Traditional methods of selling goods and services have involved the use of incentives. For example, merchants at brick and mortar stores offer deals such as "buy one get one free." This marketing technique is known in the marketing industry as BOGOF or BOGO and is a very effective form of offering special deals for goods. In addition, many companies offer reward programs for brand loyalty. For example, airline companies allow customers to participate in frequent flyer programs to provide round trip airline tickets after a predetermined amount of miles have been flown. Other companies offer loyalty cards where a customer is given a gift card after purchasing a predetermined dollar amount. These loyalty programs have been successful in giving adequate incentives for shoppers to buy goods/services.

In recent years, the Internet has changed the way merchants market and sell their products to buyers. Websites such as Amazon.com offer books and other products, and the website Zappos.com focuses on selling shoes. These websites include a secure transaction webpage where the shopper can enter his or her credit card information (or use PayPal or any other similar online payment processor) to purchase various products. Some websites offer one specific product for one day only ("one day sale"), while other websites sell products with a variable price that decreases as more people buy the product until their inventory runs out.

For purposes of discussion, the term "webpage" is defined as a document or resource of information found on the Internet that can be accessed through a web browser and displayed on a computer screen. The term "website" is defined as a collection of related webpages, images, videos, or other digital assets that are addressed with a common domain name or IP address in an Internet Protocol-based network. A website is hosted on at least one web server, and is accessible via a network such as the Internet or a private local area network.

Furthermore, companies have embraced reward programs with electronic commerce (or "e-commerce") to sell goods and services. E-commerce involves the buying and selling of products or services over electronic systems such as the Internet and other computer networks. The amount of trade conducted electronically has grown significantly with the widespread adoption of broadband Internet. For example, ShopSite offers a customer rewards program that includes the traditional BOGO rewards program. CDnow has launched a customer incentive program called Fast Forward Rewards that gives customers points that can be redeemed online for merchandise. Shoppers who purchase from CDnow earn reward points for every dollar spent. Customers can cash in their points for a variety of CDnow products from the Fast Forward Rewards Catalogue. Another example of an e-commerce site is Groupon, which offers a deal of the day to local markets. When a certain number of people sign up for the deal of the day offer, the deal becomes available to all. However, the website requires that a predetermined minimum be reached. If this predetermined minimum is not met, no one gets the deal of that day.

However, in the case of conventional e-commerce reward websites, the use of progressive incentives tied to digital goods is not prevalent. In addition, conventional e-commerce websites seem to lack any display of progressive incentives to lure e-commerce shoppers to purchase products.

The present invention has been made to solve the above problems, and an object of the present invention is to provide methods and systems for progressive e-commerce. Another object of the present invention is to provide digital goods that can be unlocked to act as incentives for e-commerce shoppers to purchase products.

BRIEF SUMMARY OF THE INVENTION

The present invention provides for an e-commerce system where progressive incentives are displayed to entice shoppers to purchase goods. The e-commerce system includes a server that has an interface for communicating over a computer network. This interface may have a graphical user interface with a display and a selection device. The e-commerce system further includes a database with a region of memory having data related to a first inventory of physical goods and a second inventory of digital goods. The e-commerce system also includes a website configured to facilitate an event, where the website is coupled to the database for accessing the first inventory in response to the event. The event may be a purchase of one or more physical goods. The e-commerce system further includes a webpage configured to display at least a portion of the first inventory that is available for sale, and to display one or more digital goods, where the webpage presents a locked digital good before the event occurs, and in response to one or more events occurring, the webpage presents an unlocked digital good.

The present invention provides for a method of providing incentives for customers to purchase physical goods. The method includes displaying, via a graphical user interface of a computer, one or more physical goods available for sale. The method also includes facilitating, via a website, an event related to the one or more physical goods, where the event may be a purchase of the one or more physical goods. The method further includes displaying, via a webpage, one or more digital goods, where the webpage presents a locked digital good before the event occurs, and in response to one or more events occurring, the webpage presents an unlocked digital good.

The present invention also provides for a computer-readable medium encoded with a computer program for causing a computer to perform a method for providing incentives for customers to purchase physical goods. The computer-readable medium causes the computer to perform the method that includes displaying, via a graphical user interface of a computer, one or more physical goods available for sale. The method also includes facilitating, via a website, an event related to the one or more physical goods, where the event may be a purchase of the one or more physical goods. The method further includes displaying, via a webpage, one or more digital goods, where the webpage presents a locked digital good before the event occurs, and in response to one or more events occurring, the webpage presents an unlocked digital good.

There are a number of advantages of the present invention. A technology is provided for presenting a physical good/product for sale, and as more of the physical product is sold, a locked digital good is unlocked for an entire audience, even for those who did not purchase the physical product. In this manner, a larger population gets the benefit of viewing the digital good, and this acts to provide more incentives for potential buyers to actually purchase additional products. The technology of the present invention can be applied to any number of social networking websites to use the collective actions of a group of people to obtain the unlocked digital good(s).

DETAILED DESCRIPTION OF THE INVENTION

The key principles of the present invention are to provide e-commerce shoppers with a digital good that is associated with a physical good. The digital good can be displayed on a webpage in an initial locked state, where the locked digital good is progressively unlocked as sales targets for physical goods are reached. According to one embodiment of the present invention, a technology is provided for presenting a physical good/product for sale, and as more of the physical product is sold, an initially locked digital good is unlocked and presented to an entire audience, even for those who did not purchase the physical product. In this embodiment, the entire digital good could be a set (i.e., two or more) of digital pictures, where the initially locked digital good is a configuration where a first digital picture is fully revealed to the audience, but the second digital picture (and possibly others) are blocked from view. As more physical goods are sold and after a predetermined purchase quantity goal is reached, the digital good is unlocked such that the second digital picture in the set of digital pictures is unlocked and revealed to the audience. Similarly, after a subsequent predetermined purchase quantity goal is realized, the digital good is unlocked such that a third digital picture in the set of digital pictures can be viewed. This process can repeat until the entire set of digital pictures is revealed to the audience. Thus, after attaining the predetermined purchase quantity goal(s), an initially locked digital good can be progressively unlocked and viewed by the entire audience, even for those who did not purchase the physical product. In this manner, a larger population gets the benefit of viewing the digital good, and this acts to provide more incentives for potential buyers to actually purchase additional products. The technology of the present invention can be applied to any number of social networking websites to use the collective actions of a group of people (i.e., crowdsourcing) to obtain the unlocked digital good(s).

Figure 1:
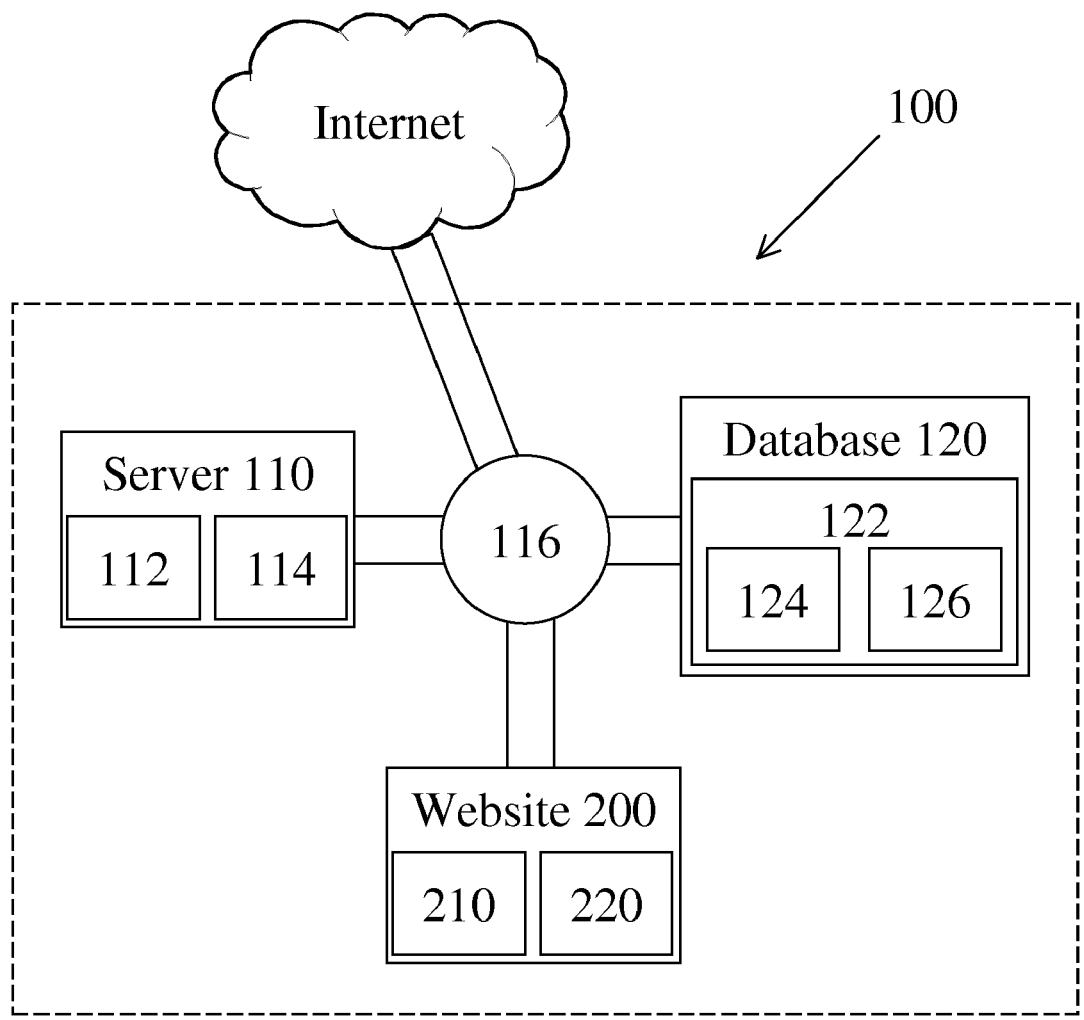
FIG. 1 illustrates an example of an e-commerce system in accordance with the present invention.

FIG. 1 illustrates an embodiment of the present invention. E-commerce system 100 includes server 110, computer network 116, database 120, and website 200. Server 110 has a display 112 (such as a computer monitor) and selection device 114 (such as a computer mouse) to facilitate the control of a graphical user interface of server 110. In this disclosure, the term "server" is defined as a computer or device on a network that manages network resources. Server 110 is coupled to computer network 116 which may be connected to a broadband network such as the Internet. Through the Internet or any other similar network, potential customers can access e-commerce system 100 via a desktop computer, laptop/netbook computer, tablet computer, handheld or palm computer, and/or a smart mobile telephone equipped for voice and data communication. Database 120 contains a region of memory 122 that has data related to a first inventory 124 and a second inventory 126. In one embodiment of the present invention, first inventory 124 is a record of physical goods which may include a different number of physical products, such as clothing, tools, appliances, vehicles, sporting event tickets, movie tickets, concert tickets, and travel tickets. Second inventory 126 is a record of digital goods, such as digital pictures, digital video, digital text, and digital audio. In this disclosure, the term "database" is defined as a collection of information that is organized so that it can easily be accessed, managed, and updated. Databases can be classified according to types of content: bibliographic, full-text, numeric, and images. Website 200, which is further highlighted in FIGS. 2A and 2B and further discussed below, may be coupled to database 120 (via computer network 116) to facilitate the purchase of one or more physical goods. Website 200 includes shopping webpage 210 and secure financial transaction webpage 220. In this disclosure, the term "webpage" is defined as a document or resource of information found on the Internet that can be accessed through a web browser and displayed on a computer screen. The term "website" is defined as a collection of related webpages, images, videos, or other digital assets that are addressed with a common domain name or IP address in an Internet Protocol-based network. A website is hosted on at least one web server, and is accessible via a network such as the Internet or a private local area network. When a shopper purchases one or more physical goods, website 200 conveys real-time information to database 120 so that an accurate inventory of physical goods can be measured. As will be further discussed below, digital goods inventory 126 is associated with physical goods inventory 124, where when the number of physical goods purchased reaches a sales target, one or more digital goods can be unlocked. Database 120 may keep track of digital goods inventory 126 to determine which digital pictures, digital images, digital video, etc. should be initially displayed, which digital goods have been partially/fully unlocked as a result of sales, and which digital goods remain locked and are available to be unlocked as more sales occur. It should be appreciated that server 110 and database 120 could comprise the same computer hardware/software, or distinctly separate hardware/software. Website 200 could be hosted within server 110, or hosted at another location. Needless to say, any known configuration for coupling a server, database, and website together can be adopted.

Figure 2A:
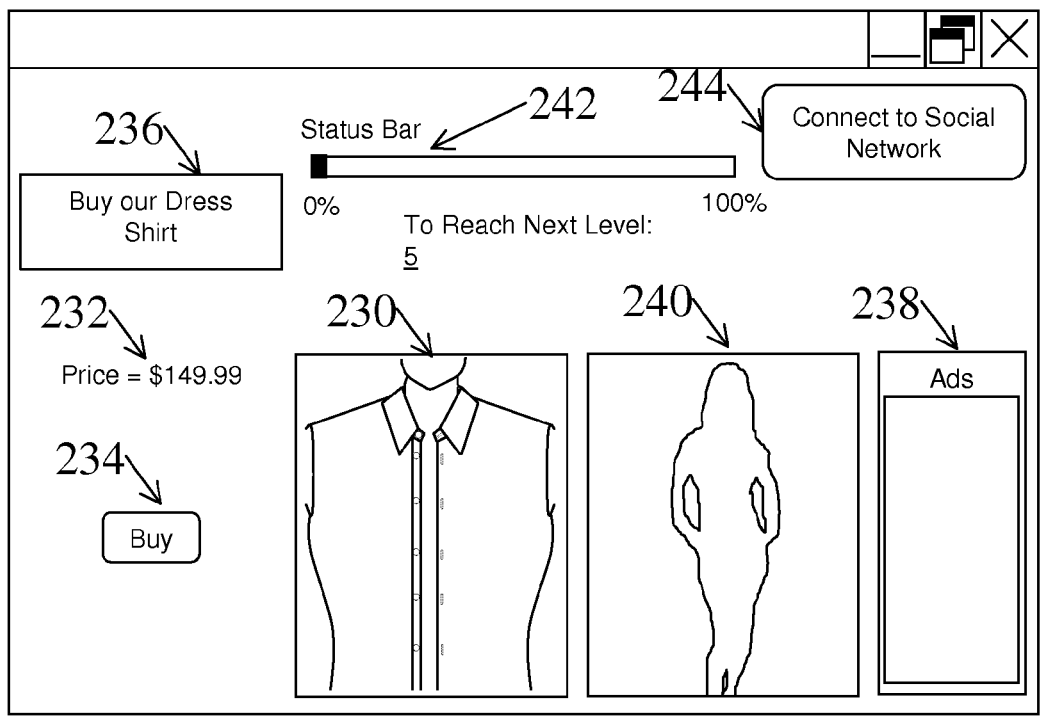
FIG. 2A illustrates an example of a shopping webpage in accordance with the present invention.
Figure 2B:
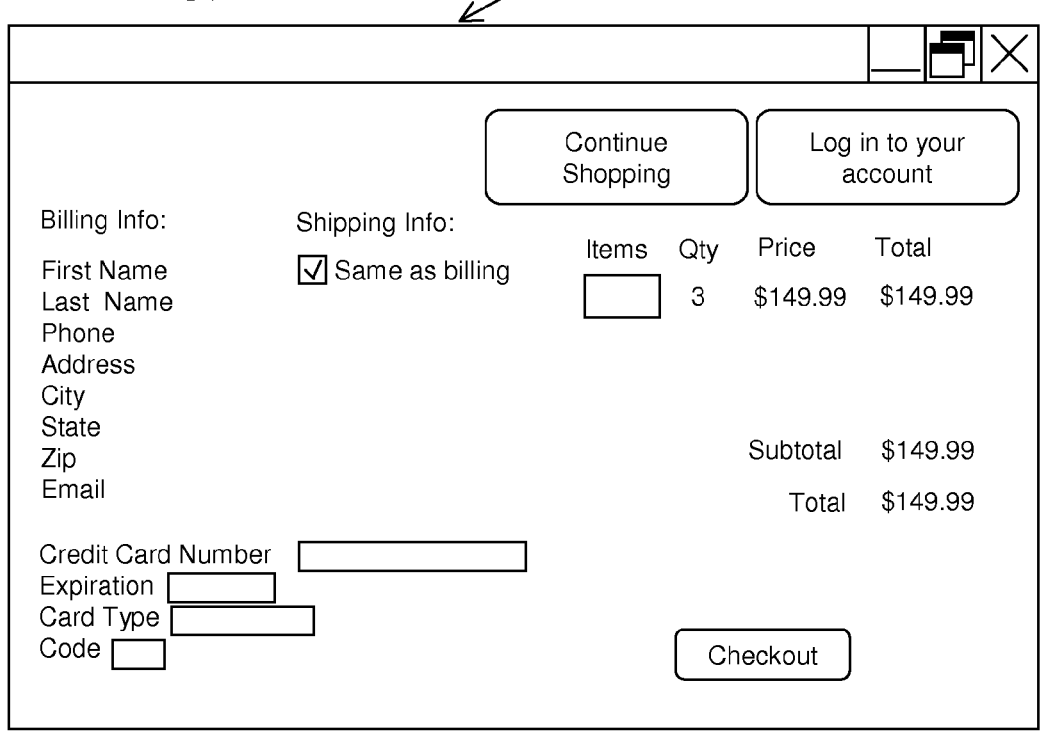
FIG. 2B illustrates an example of a secure financial transaction webpage in accordance with the present invention.

FIG. 2A illustrates an embodiment of shopping webpage 210 in accordance with the present invention. Website 200 includes shopping webpage 210 with an offer of sale for physical good 230, the display of physical good sales price 232, buy button 234, marketing text banner 236, advertising banner 238, an initial display of locked digital good 240, digital good status bar 242, connect to social network button 244, and secure financial transaction webpage 220 (see FIG. 2B). Physical good 230 may include a different number of physical products, such as clothing, tools, appliances, vehicles, sporting event tickets, movie tickets, concert tickets, and travel tickets. Digital good 240 may include digital pictures, digital video, digital text, and digital audio. In the embodiment shown in FIG. 2A, the physical good for sale is a dress shirt, and the digital good to be unlocked is a digital picture.

Upon entering webpage 210, a shopper has the ability to purchase one or more physical goods. In some embodiments of the present invention, the minimum quantity of purchased physical goods required to unlock at least a portion of digital good 240 is displayed at status bar 242. For example, imagine the shopper decides to purchase three dress shirts on webpage 210. A predetermined threshold of five purchased dress shirts has been set by the website administrator, and this quantity is displayed at/near status bar 242 as the minimum quantity of dress shirts needed to unlock a portion of digital good 240. It should be appreciated that these predetermined thresholds (i.e., sales targets) could comprise any quantity (i.e., dollar amount or item amount), and that subsequent predetermined thresholds to further unlock the digital good(s) could vary from each other. For example, the first threshold could be five purchased items, the second threshold could be ten purchased items, the third threshold could be twenty purchased items, and so on. In another example, each threshold to unlock the digital good(s) could be equal to the same quantity, such as ten purchased items or $1000.

In the embodiment shown in FIG. 2A, the initial display of digital good 240 is a complete digital picture of a supermodel. Marketing text banner 236 displays specific text related to the sale of physical good 230. In one embodiment of the present invention, the supermodel in the digital picture(s) of digital good 240 actually wears the particular dress shirt for sale. In other words, the display of physical good 230 and digital good 240 could be combined into one illustration on webpage 210. Advertising banner 238 may include advertisements related to the physical good presented for sale. The shopper may click on buy button 234, which brings him to secure financial transaction webpage 220. In some embodiments, secure financial transaction webpage 220 is provided and/or facilitated by a third party payment processor such as PayPal or any other similar online payment processor to conduct e-commerce payments and money transfers made through the Internet. Here, at secure financial webpage 220, the shopper may enter the quantity of physical goods (e.g., three dress shirts) he desires to purchase, enter his credit card information, and execute the secure financial transaction. Upon completing a successful financial transaction, website 200 communicates with database 120 to update physical good inventory 124. Website 200 also communicates with database 120 to update digital good inventory 126. As a result, status bar 242 is updated to reflect that the sale of only two more dress shirts is required to unlock the digital good to reveal the next complete digital picture of the supermodel. In some embodiments of the present invention, after this sales target of five dress shirts is reached, this digital good is unlocked and presented to the website audience, even for those who did not purchase the physical product. In this manner, a larger population gets the benefit of viewing the digital good, and this acts to provide more incentives for potential buyers to actually purchase additional products. To encourage his friends to also buy more physical goods and work together to view the next digital picture, the shopper clicks on connect to social network button 244. By clicking on connect to social network button 244, website 200 links to external social networks such as Facebook (which may be performed by integrating with Facebook Connect) and MySpace and informs the shopper's friends that he has purchased three dress shirts and that only two more dress shirts need to be purchased before unlocking the digital good to reveal the next complete digital picture of the supermodel on the webpage. Because the technology of the present invention can be applied to any number of social networking websites, the use of the collective actions of a group of people (i.e., crowdsourcing) can be taken advantage of to obtain more unlocked digital good(s).

Each predetermined threshold (i.e., sales target) that acts as an incentive for people to purchase physical goods and to continue unlocking the digital good could also be attached to a time limitation. For example, status bar 242 could display that twenty dress shirts need to be purchased within the next four hours to unlock the next stage of digital good 240. Moreover, status bar 242 could display that the next two stages (i.e., the next two digital pictures or the next two portions of a single digital picture) of digital good 240 could be unlocked if fifty dress shirts are purchased within the present day. It should be appreciated that any variation of quantities and time limitations could be used in accordance with the present invention. In addition, in other embodiments of the present invention, digital good 240 comprises digital video, digital text, and digital audio. For example, digital good 240 could be a digital video, where the initial version displayed is an introduction digital video. As more physical goods are purchased, and the quantity of purchased physical goods hits the sales targets, subsequent digital videos could be revealed to the website audience. In other embodiments, the initial version displayed could be a first portion of a complete digital video, where a few seconds of the video are shown. As more physical goods are purchased, and the quantity of purchased physical goods hits the sales targets, subsequent portions of the complete digital video are shown.

Figure 3:
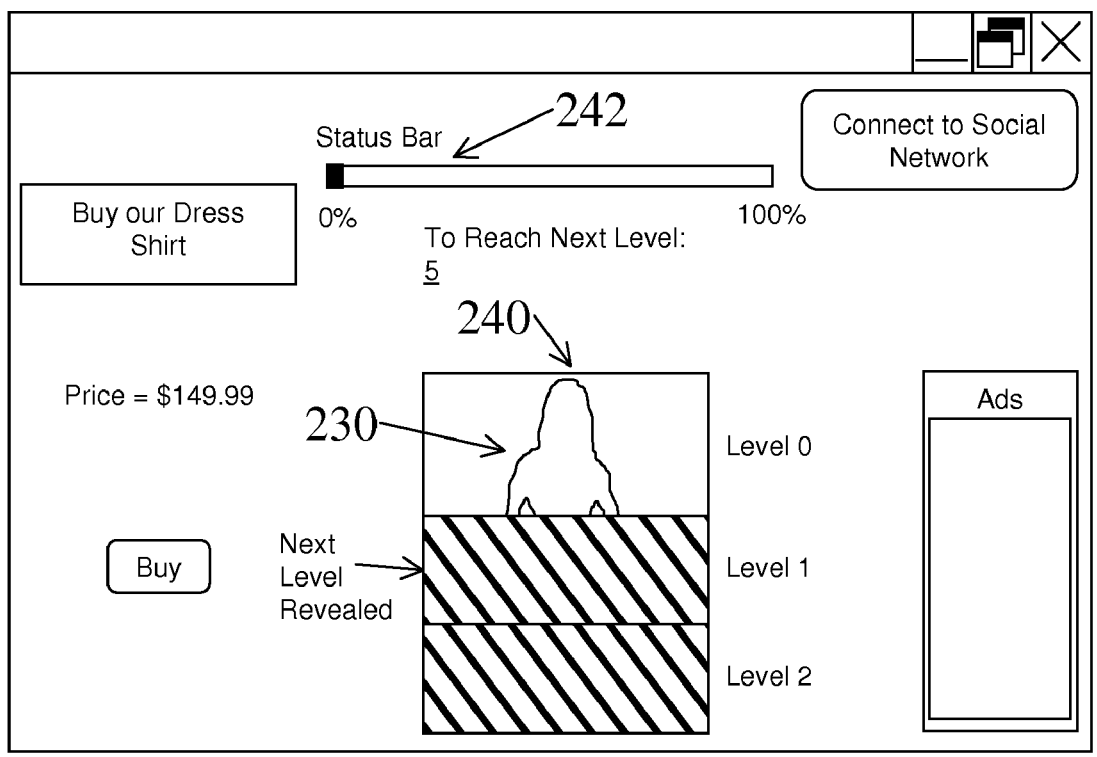
FIG. 3 illustrates an example of the shopping webpage of the present invention where a digital good is gradually revealed in increments based on satisfying target purchase levels.

FIG. 3 illustrates another embodiment of the present invention. Digital good 240 of FIG. 3 is gradually revealed in increments based on satisfying target purchase levels. In the embodiment shown in FIG. 2A, the initially locked digital good is a complete digital picture of a supermodel. However, in the embodiment shown in FIG. 3, the initially locked digital good is a partial view of the entire digital picture, where the supermodel is wearing the dress shirt (i.e., physical good 230) for sale. In order to view more parts of the digital picture, the next target quantity of dress shirts needs to be fulfilled to unlock the next portion of digital good 240. For example, status bar 242 could display that once five dress shirts are purchased, the next segment of a digital picture will be shown. Once several targets have been reached, and after the entire digital picture has been shown, a subsequent new digital picture may be presented on the website to be unlocked. In other words, digital good 240 is displayed at an initial locked state that encourages the audience to purchase more physical goods to gradually reveal the full complete view of the digital picture in increments.

Figure 4:
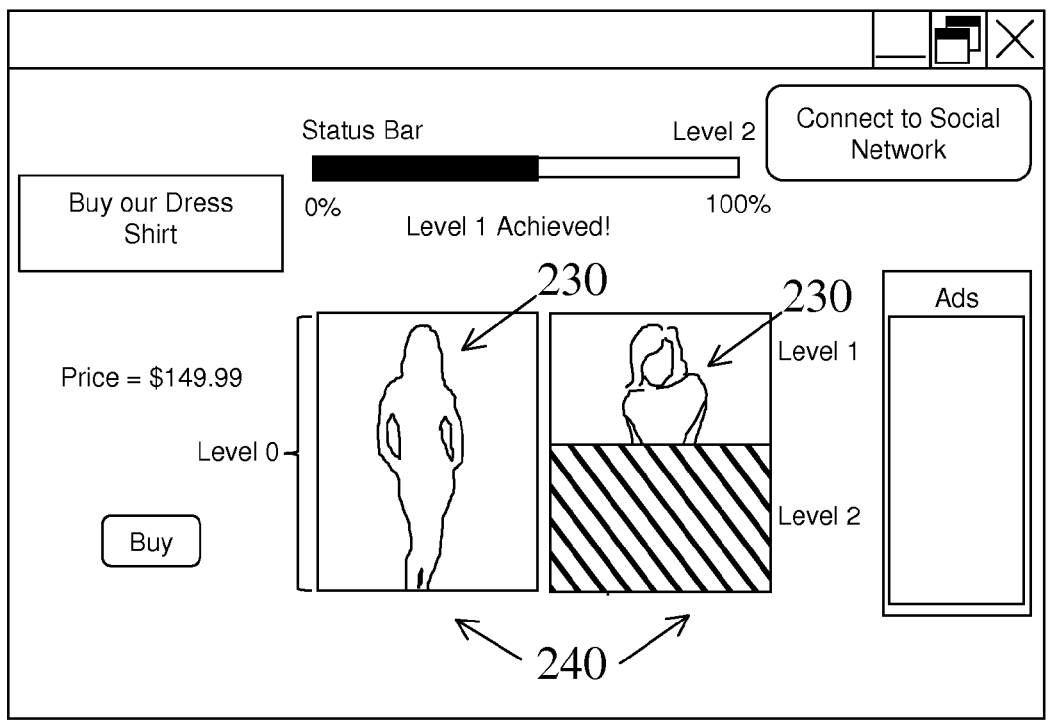
FIG. 4 illustrates an example of the shopping webpage of the present invention where after a predetermined threshold is satisfied to unlock a second digital picture, the second digital picture is a partial view of a new picture.
Figure 5:
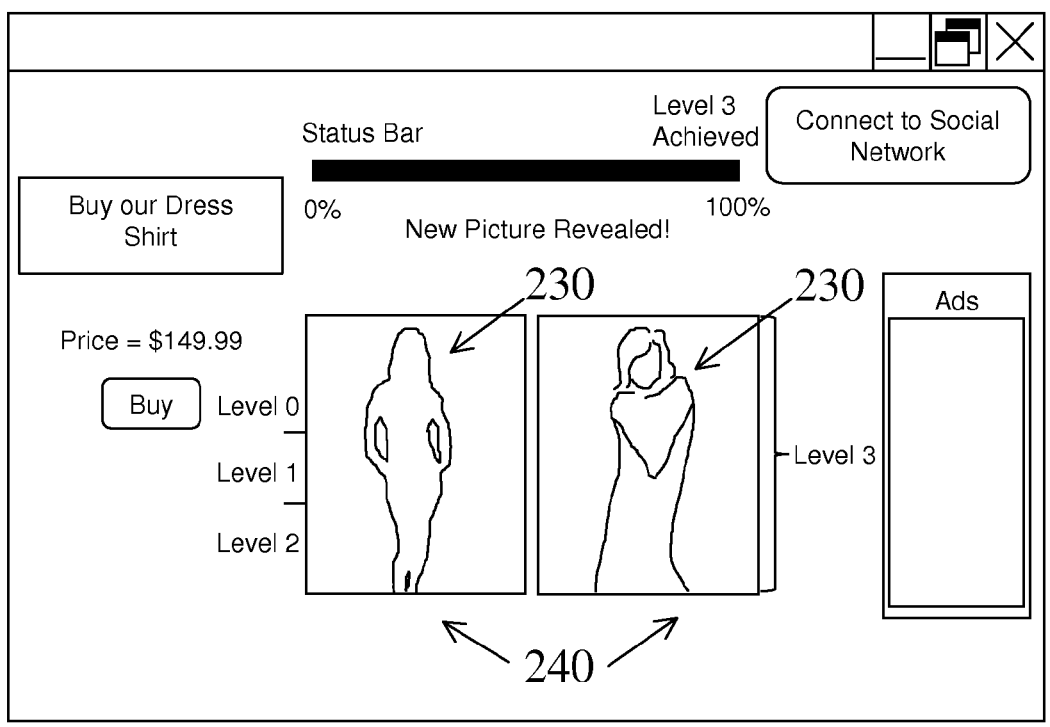
FIG. 5 illustrates an example of the shopping webpage of the present invention where an initially locked digital good is a partial view of a first digital picture, and after predetermined thresholds are met to unlock the digital good and present a complete view of the first digital picture, a second digital picture is revealed, where the second digital picture is a full complete view.

FIG. 4 illustrates still another embodiment of the present invention. Digital good 240 includes a set of digital pictures where the initial view is a first complete digital picture of a supermodel. When the predetermined threshold is satisfied to unlock a second digital picture, this second digital picture is only a partial view of a new picture of the supermodel. In this manner, a combination of complete digital pictures and partial views of digital pictures are used to act as incentives to encourage the website audience to purchase more physical goods. FIG. 5 illustrates an embodiment of the present invention, where digital good 240 includes a set of digital pictures where the initial view is a partial view of a complete digital picture. As predetermined thresholds are met to unlock the digital good to reveal a full view of the digital picture, the next digital picture is a full complete view of a new picture of the supermodel. It should be appreciated that any combination of full views and partial views of digital pictures could be used to act as incentives in accordance with the present invention.

Figure 6:
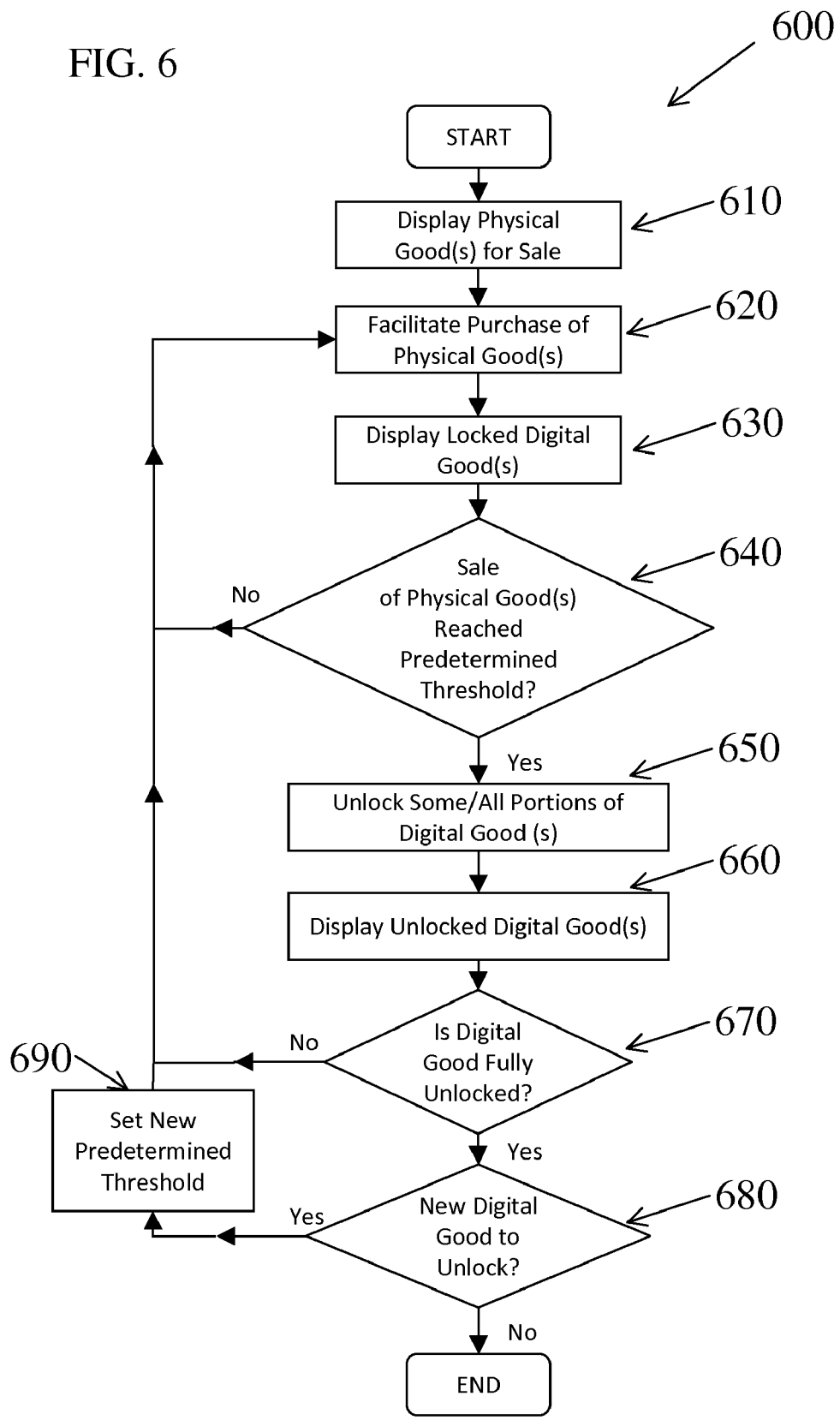
FIG. 6 illustrates an example of a flowchart highlighting a method in accordance with the present invention.

FIG. 6 illustrates an embodiment in accordance with the present invention. Flowchart 600 highlights a method of providing incentives for customers or shoppers to purchase physical goods. In some embodiments of the present invention, before the method described in flowchart 600 begins, at least one predetermined threshold (i.e., sales target) is established within the progressive e-commerce system, either automatically from the system or manually by an administrator. In step 610, the physical good(s) are displayed for sale on a graphical user interface. For example, a computer monitor can be used to display any number of physical goods available for sale. In some embodiments, the physical goods displayed on the computer monitor are displayed on website 200. In step 620, a website is used to facilitate the purchase of one or more physical goods. Website 200 with shopping webpage 210 and secure financial transaction webpage 220 as described in the paragraphs above could be used to facilitate the purchase of physical goods. In step 630, a webpage displays an initially locked digital good. In some embodiments, the initially locked digital good is a set of digital pictures where a first complete digital picture is displayed but the other digital pictures are blocked from view. In other embodiments, the initially locked digital good is a set of digital pictures where a first partial view of a digital picture is displayed and the other digital pictures are blocked from view. In step 640, a determination is made as to whether the sale of physical goods has reached a predetermined threshold (i.e., sales target). If the predetermined threshold has not been satisfied, the facilitation of more physical good purchases is done (i.e., return to step 620). For example, the use of marketing text banner 236, advertising banner 238, and connect to social network button 244 could be used to encourage more people to purchase physical goods. If this predetermined threshold has been satisfied, then the digital good is unlocked (step 650). In some embodiments, this "unlocking" step involves configuring the progressive e-commerce system in a manner so that a subsequent complete digital picture from the set of pictures is in a condition to be displayed on the webpage. In other embodiments, this "unlocking" step involves configuring the progressive e-commerce system in a manner so that a partial view of a subsequent digital picture is in a condition to be displayed on the webpage. Continuing to step 660, the unlocked digital good is displayed on the webpage. In step 670, a determination is made whether the current digital good is fully unlocked (i.e., whether every picture in the set of digital pictures has been displayed). If the digital good is not fully unlocked and has additional portions to reveal, the method returns to step 620. If the digital good has been fully unlocked, a determination is made whether there is another digital good available to be unlocked (step 680). For example, this determination could be done with database 120 and digital good inventory 126 to keep track of which digital goods have been partially/fully unlocked as a result of sales, and which digital goods remain locked and are available to be unlocked as more sales occur. If there is another digital good available to be unlocked, a new predetermined threshold (i.e., sales target) may be set (step 690) and the method can return to step 620. In some embodiments, the method highlighted in flowchart 600 results in additional complete digital pictures being unlocked and revealed on the website as subsequent sales targets are satisfied. It should be appreciated that the progressive e-commerce system can establish any number of predetermined thresholds (i.e., sales targets) in advance of performing the method described in flowchart 600. Such sales targets could be set either automatically from the system or manually by an administrator. As highlighted in FIGS. 4 and 5, in other embodiments, any combination of full views and partial views of digital pictures could be unlocked to act as incentives in accordance with the present invention.

It will be appreciated by one skilled in the art that variations to this flowchart may be made consistent with embodiments of the present invention. For example, flowchart 600 could include an additional step asking a potential shopper to fill out a survey. Flowchart 600 could also include a step where after making a purchase, a shopper is asked to link to an external social network such as Facebook or MySpace which updates his user profile to inform his friends that he purchased physical goods which has contributed to the unlocking of digital good(s) for others to view.

It should be appreciated that the digital good of the present invention could comprise both digital pictures and digital videos. In other words, an initially locked digital good could be a complete view of a digital picture, where the first unlocked stage of the digital good reveals a complete digital video. Any combination of digital pictures, digital video, digital text, and digital audio could be used to act as incentives in accordance with the present invention.

Embodiments of the present invention may be implemented using special-purpose hardware, software executing on general-purpose or special-purpose processors, or any combination thereof. The embodiments have been described in terms of functional blocks that might or might not correspond to separate devices in a particular implementation. Although the present disclosure may refer to a general-purpose computing system, those of ordinary skills in the art with access to the present disclosure will recognize that the invention may be employed in a variety of other embodiments, including special-purpose computing systems or any other computing system that provides e-commerce capability.

Computer programs embodying various features of the present invention may be encoded on computer-readable media for storage and/or transmission; suitable media include magnetic disk or tape, optical storage media such as compact disk (CD) or DVD (digital versatile disk), flash memory, and carrier signals for transmission via wired, optical, and/or wireless networks conforming to a variety of protocols, including the Internet. Computer-readable media encoded with the program code may be packaged with a compatible device such or provided separately from other devices (e.g., via Internet download).

Thus, although the invention has been described with respect to specific embodiments, it will be understood that modifications and variations may be effected without departing from the scope of the present invention. For example, the locked/unlocked digital goods (e.g., digital pictures) could all appear on the same webpage, but the locked/unlocked digital goods could also be presented on any number of sale webpages. Further, in alternate embodiments of the present invention, a locked digital good includes a digital picture that is blurred or pixilated. The digital good may be unlocked incrementally, where the digital picture becomes clearer (i.e., less blurry/pixilated) as sales targets are satisfied. Accordingly, the foregoing description is intended to be illustrative, but not limiting, of the scope of the invention which is set forth in the following claims.

What is claimed is:

1. A method of providing incentives for customers to purchase physical goods, the method comprising:
    displaying, via a graphical user interface of a computer, one or more physical goods available for sale;
    facilitating, via a website, an event related to the one or more physical goods, wherein the event is a purchase of the one or more physical goods;
    displaying, via a webpage, a full complete view of a first digital picture;
    displaying, via the webpage, a full compete view of a second digital picture when the number of events reaches a predetermined threshold.

2. The method of claim 1, wherein the physical goods comprise: collar stays, cufflinks, undershirts, dress shirts, coats, jackets, polo shirts, uniforms, long sleeve shirts, and blazers.

3. The method of claim 1, further comprising:
    linking the website to an external social networking website;
    sending information, based on the one or more physical goods, to a group of people affiliated with the external social networking website; and
    displaying a status of the predetermined threshold indicating how many more events are needed to reach the predetermined threshold.

4. A method of providing incentives for customers to purchase physical goods, the method comprising:
    displaying, via a graphical user interface of a computer, one or more physical goods available for sale;
    facilitating, via a website, an event related to the one or more physical goods, wherein the event is a purchase of the one or more physical goods;
    displaying, via a webpage, a partial view of a first digital picture;
    displaying, via the webpage, an additional portion of the first digital picture in response to one or more events occurring; and
    displaying, via the webpage, a full complete view of the first digital picture when the number of events reaches a predetermined threshold.

5. The method of claim 4, wherein after the webpage presents the full complete view of the first digital picture, the method further comprises:
    presenting, via the webpage, a partial view of a second digital picture wherein when the number of events reaches a subsequent predetermined threshold, the webpage presents a full complete view of the second digital picture.

6. The method of claim 4, wherein after the webpage presents the full complete view of the first digital picture, the method further comprises:
    presenting, via the webpage, a full complete view of a second digital picture when the number of events reaches a subsequent predetermined threshold.

7. The method of claim 4, wherein the physical goods comprise: collar stays, cufflinks, undershirts, dress shirts, coats, jackets, polo shirts, uniforms, long sleeve shirts, and blazers.

8. The method of claim 4, further comprising:
    linking the website to an external social networking website;
    sending information, based on the one or more physical goods, to a group of people affiliated with the external social networking website; and
    displaying a status of the predetermined threshold indicating how many more events are needed to reach the predetermined threshold.

9. A non-transitory computer-readable medium encoded with a computer program for causing a computer to perform a method for providing incentives for customers to purchase physical goods, the method comprising:
    displaying, via a graphical user interface of a computer, one or more physical goods available for sale;
    facilitating, via a website, an event related to the one or more physical goods, wherein the event is a purchase of the one or more physical goods;
    displaying, via a webpage, a full complete view of a first digital picture;
    displaying, via the webpage, a full complete view of a second digital picture when the number of events reaches a predetermined threshold.

10. The non-transitory computer-readable medium of claim 9, wherein the physical goods comprise: collar stays, cufflinks, undershirts, dress shirts, coats, jackets, polo shirts, uniforms, long sleeve shirts, and blazers.

11. The non-transitory computer-readable medium of claim 9, wherein the computer-readable medium is encoded with the computer program for causing the computer to perform the method that further comprises:
    linking the website to an external social networking website;
    sending information, based on the one or more physical goods, to a group of people affiliated with the external social networking website; and
    displaying a status of the predetermined threshold indicating how many more events are needed to reach the predetermined threshold.

* * * * *